(12) United States Patent
Spitzer (10) Patent No.: US 8,699,842 B2
(45) Date of Patent: Apr. 15, 2014

(54) IMAGE RELAY WAVEGUIDE AND METHOD OF PRODUCING SAME

(75) Inventor: Mark B. Spitzer, Sharon, MA (US)

(73) Assignee: Google Inc., Mountain View, CA (US)

( * ) Notice: Subject to any disclaimer, the term of this patent is extended or adjusted under 35 U.S.C. 154(b) by 299 days.

(21) Appl. No.: 13/117,965

(22) Filed: May 27, 2011

(65) Prior Publication Data

US 2012/0301074 A1     Nov. 29, 2012

(51) Int. Cl.
*G02B 6/00* (2006.01)
*G02B 6/34* (2006.01)
*G02B 6/26* (2006.01)
*G02B 6/42* (2006.01)

(52) U.S. Cl.
USPC ............... 385/133; 385/31; 385/36; 385/37; 385/47

(58) Field of Classification Search
USPC ............................................. 349/13; 385/133
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |

(Continued)

FOREIGN PATENT DOCUMENTS

| | | |
|---|---|---|
| GB | 2 272 980 A | 6/1994 |
| JP | 2007-156096 A | 6/2007 |
| JP | 2008-122475 A | 5/2008 |
| WO | WO 96/05533 A1 | 2/1996 |

OTHER PUBLICATIONS

Levola, T., "Diffractive Optics for Virtual Reality Displays", Academic Dissertation, Joensuu 2005, University of Joensuu, Department of Physics, Vaisala Laboratory, 26 pages.

(Continued)

*Primary Examiner* — Rhonda Peace
(74) *Attorney, Agent, or Firm* — Blakely Sokoloff Taylor & Zafman LLP (57) ABSTRACT

Described are embodiments of a process including patterning one or more reflectors on a surface of a substrate of a material, the surface oriented at a selected angle relative to a (100) crystallographic plane of the material, and etching one or more reflectors in the surface, each reflector including one or more reflective surfaces formed by (111) crystallographic planes of the material. Also described are process embodiments for forming a molded waveguide including preparing a waveguide mold, the waveguide mold comprising a master mold including one or more reflectors on a surface of a substrate of a master mold material, the surface oriented at a selected angle relative to a (100) crystallographic plane of the material, each reflector including one or more reflective surfaces formed by (111) crystallographic planes of the material, injecting a waveguide material into the waveguide mold, and releasing the molded waveguide from the waveguide mold.

5 Claims, 11 Drawing Sheets

(56) References Cited

U.S. PATENT DOCUMENTS

| | | | |
|---|---|---|---|
| 6,115,521 A | 9/2000 | Tran et al. | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,538,799 B2 | 3/2003 | McClelland et al. | |
| 6,618,099 B1 | 9/2003 | Spitzer | |
| 6,690,516 B2 | 2/2004 | Aritake et al. | |
| 6,700,632 B2 * | 3/2004 | Taniguchi et al. | 349/65 |
| 6,701,038 B2 | 3/2004 | Rensing et al. | |
| 6,704,070 B2 * | 3/2004 | Taniguchi et al. | 349/65 |
| 6,717,635 B2 * | 4/2004 | Taniguchi et al. | 349/65 |
| 6,724,354 B1 | 4/2004 | Spitzer et al. | |
| 6,738,535 B2 | 5/2004 | Kanevsky et al. | |
| 6,747,611 B1 | 6/2004 | Budd et al. | |
| 6,829,095 B2 | 12/2004 | Amitai | |
| 6,879,443 B2 | 4/2005 | Spitzer et al. | |
| 7,158,096 B1 | 1/2007 | Spitzer | |
| 7,242,527 B2 | 7/2007 | Spitzer et al. | |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,674,028 B2 * | 3/2010 | Cassarly et al. | 362/600 |
| 7,724,441 B2 | 5/2010 | Amitai | |
| 7,724,442 B2 | 5/2010 | Amitai | |
| 7,724,443 B2 | 5/2010 | Amitai | |
| 7,843,403 B2 | 11/2010 | Spitzer | |
| 7,900,068 B2 | 3/2011 | Weststrate et al. | |
| 8,004,765 B2 | 8/2011 | Amitai | |
| 8,059,342 B2 * | 11/2011 | Burke | 359/630 |
| 8,098,439 B2 | 1/2012 | Amitai et al. | |
| 8,189,263 B1 | 5/2012 | Wang et al. | |
| 2001/0048548 A1 * | 12/2001 | Yee | 359/362 |
| 2002/0021384 A1 * | 2/2002 | Taniguchi et al. | 349/65 |
| 2003/0080450 A1 * | 5/2003 | Taniguchi et al. | 264/2.5 |
| 2003/0086031 A1 * | 5/2003 | Taniguchi et al. | 349/65 |
| 2003/0090439 A1 | 5/2003 | Spitzer et al. | |
| 2003/0218718 A1 | 11/2003 | Moliton et al. | |
| 2004/0066817 A1 * | 4/2004 | Ungar | 372/45 |
| 2005/0007672 A1 | 1/2005 | Wu | |
| 2005/0127278 A1 | 6/2005 | Cok | |
| 2005/0174651 A1 | 8/2005 | Spitzer et al. | |
| 2005/0180021 A1 | 8/2005 | Travers | |
| 2005/0213626 A1 * | 9/2005 | Ungar | 372/44.11 |
| 2005/0219152 A1 | 10/2005 | Budd et al. | |
| 2006/0192306 A1 | 8/2006 | Giller et al. | |
| 2006/0192307 A1 | 8/2006 | Giller et al. | |
| 2008/0062400 A1 * | 3/2008 | Shioi et al. | 356/36 |
| 2008/0198890 A1 * | 8/2008 | Ungar et al. | 372/50.11 |
| 2008/0219025 A1 | 9/2008 | Spitzer et al. | |
| 2009/0122414 A1 | 5/2009 | Amitai | |
| 2010/0046070 A1 | 2/2010 | Mukawa | |
| 2010/0103078 A1 | 4/2010 | Mukawa et al. | |
| 2010/0149073 A1 | 6/2010 | Chaum et al. | |
| 2010/0157433 A1 | 6/2010 | Mukawa et al. | |
| 2010/0278480 A1 | 11/2010 | Vasylyev | |
| 2011/0043142 A1 | 2/2011 | Travis et al. | |
| 2011/0213664 A1 | 9/2011 | Osterhout et al. | |
| 2012/0301074 A1 * | 11/2012 | Spitzer | 385/15 |
| 2013/0016292 A1 | 1/2013 | Miao et al. | |
| 2013/0033756 A1 | 2/2013 | Spitzer et al. | |

OTHER PUBLICATIONS

Mukawa, H. et al., "8.4: Distinguished Paper: A Full Color Eyewear Display using Holographic Planar Waveguides", SID Symposium Digest of Technical Papers, 2008, vol. 39, Issue 1, pp. 89-92.

Lee, Daniel C. et al., "Monolithic Chip-to-chip WDM Optical Proximity Coupler Utilizing Echelle Grating Multiplexer/Demultiplexer Integrated with Micro Mirrors Built on SOI Platform," Photonics Society Summer Topical Meeting Series, 2010 IEEE, pp. 215-216.

PCT/US2012/036317, PCT International Search Report and Written Opinion, mailed Oct. 30, 2012, 7 pages.

* cited by examiner

IMAGE RELAY WAVEGUIDE AND METHOD OF PRODUCING SAME

TECHNICAL FIELD

The disclosed embodiments relate generally to optics and in particular, but not exclusively, to an image relay waveguide and methods of making the same.

BACKGROUND

Waveguides are used to channel electromagnetic radiation and transport it from an origin to a destination. Typically, radiation such as visible light enters one part of the waveguide, is transported through the waveguide by reflection from the sides of the waveguide, and exits at another part of the waveguide. In certain applications waveguides must be carefully manufactured to very tight dimensional and angular tolerances so that the information content of the radiation traveling through the waveguide is preserved.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an image relay waveguide and a method for making the same are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics described can be combined in any suitable manner in one or more embodiments.

Figure 1A:
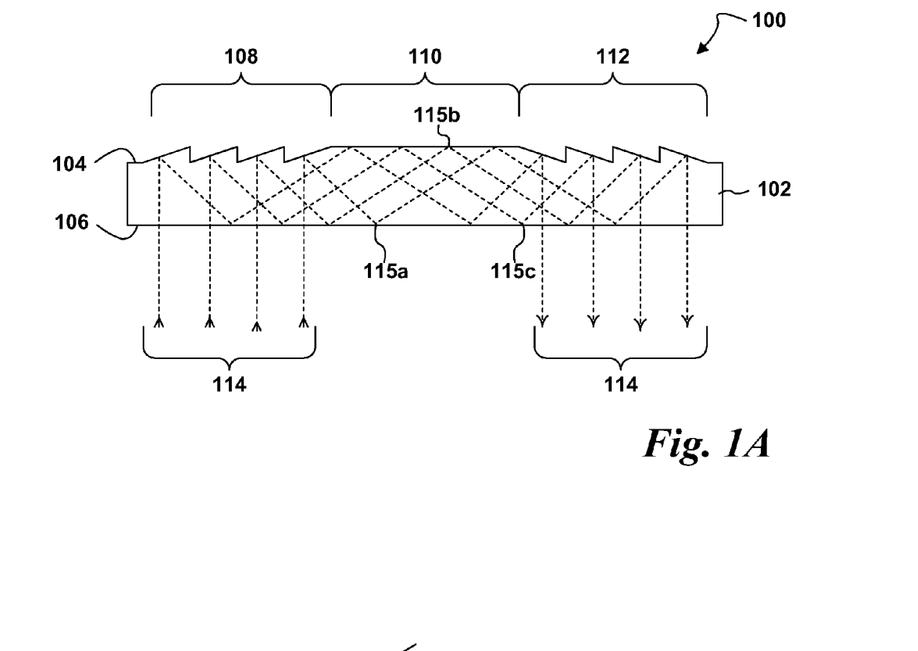
FIG. 1A is a cross-sectional drawing of an embodiment of an image relay waveguide.
Figure 1B:
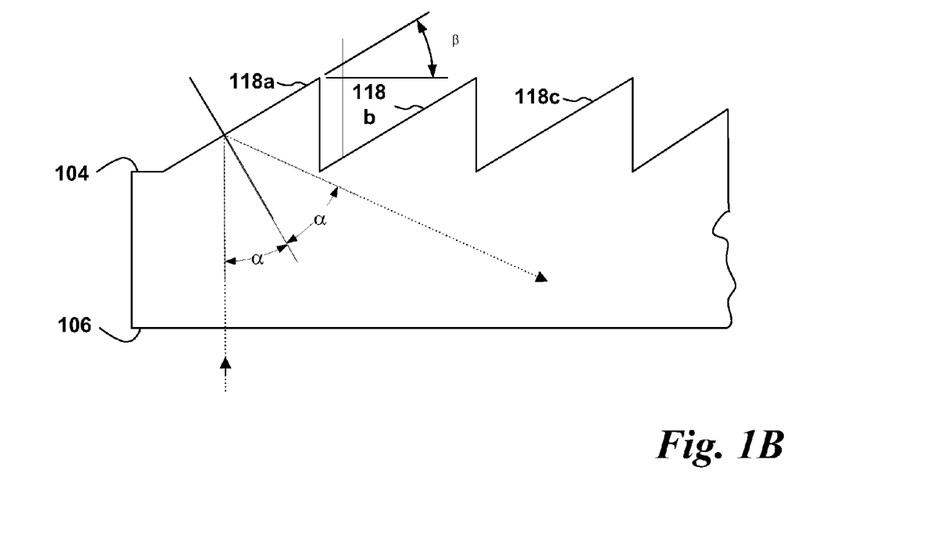
FIG. 1B is a cross-sectional drawing of an embodiment of a reflector in a waveguide.

FIGS. 1A-1B illustrate an embodiment of a waveguide 100 based on total internal reflection. Waveguide 100 includes a substrate 102 having a first surface 104 and a second surface 106. A pair of reflectors 108 and 112 are formed in surface 104, and the reflectors are separated by a region 110 with no reflectors. In operation of waveguide 100, a plurality of rays 114 enter the waveguide through surface 106 and are reflected from reflector 108 into region 110. If the angle of the rays exceeds the critical angle for total internal reflection, rays 114 will be reflected internally at the surface of the waveguide in region 110, at locations such as 115a, 115b and 115c. The rays travel along paths through region 110 until they reach reflector 112, where the rays are reflected such that they exit the waveguide through surface 106. Alternatively, to make total internal reflection unnecessary the surfaces of the waveguide can be coated with a metal or with a thin film optical stack to provide high reflectance.

FIG. 1B illustrates an embodiment of a reflector such as reflector 108. In one embodiment of waveguide 100, reflectors 108 and 112 can have the same configuration, but in other embodiments they can be differently configured. Reflector 108 includes one or more reflective surfaces 118a-118c, each of which is oriented at an angle β relative to surface 104. Rays entering the waveguide through surface 106 are incident on reflective surfaces 118a-118c at an angle α and, by the law of reflection, are reflected from surfaces 118a-118c at angle α. If the distance of the image plane is infinity (i.e., the rays are collimated), the angles of the individual rays represent the spatial information in the image. To preserve this spatial information, the ray angles must be preserved as the rays propagate into and through the waveguide. Small errors in the orientation or flatness of reflective surfaces 118a-118c can introduce angular errors that in turn cause errors or artifacts in the image formed by rays exiting the waveguide. If the surfaces of reflective surfaces 118a-118c are not parallel (e.g., angle β is not the same for all surfaces), errors in propagation angle are also introduced, leading to a degraded image. Angle errors in reflective surfaces 118 can result from manufacturing tooling errors. Waveguides may be fabricated from injection molding, casting or hot pressing, and in such cases any error in the tool used to pattern reflectors 108 and 112 is replicated in the waveguide.

Figure 2A:
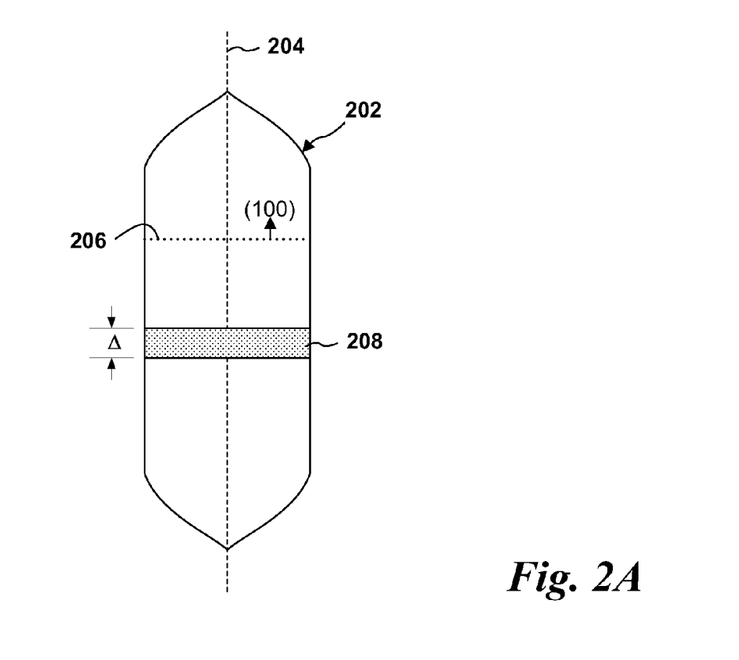
FIGS. 2A-2D are cross-sectional drawings of an embodiment of a process for forming one or more reflectors in a substrate.

FIGS. 2A-2D together illustrate a process for forming one or more reflectors in a substrate. FIG. 2A illustrates an initial part of the process in which a wafer 208 is cut from a boule 202. A boule is a single-crystal ingot of a material produced by synthetic means; the boule material used will depend on the contemplated applications of the devices made from the material, but different embodiments of a boule can be made of any material that can be selectively etched, such as single crystal silicon. In the illustrated embodiment, boule 202 is generally cylindrical in shape and is axisymmetric about axis 204. Boule 202 is produced such that (100) crystallographic planes of the material are normal to axis 204 or, put differently, such that the normals of (100) planes are parallel to axis 204 as shown in the figure. Using the naming conventions known in the art of crystallography, (100) represents the Miller indices of a crystal plane in the material lattice. To begin forming a device such as a waveguide, a wafer 208 is first cut from boule 202. Wafer 208 of thickness Δ can be cut from the boule with a diamond saw along planes normal to axis 204, such that wafer 208 has a substantially circular shape. After cutting wafer 208 from the boule, additional processing steps such as surface polishing can be performed on the wafer.

Figure 2B:
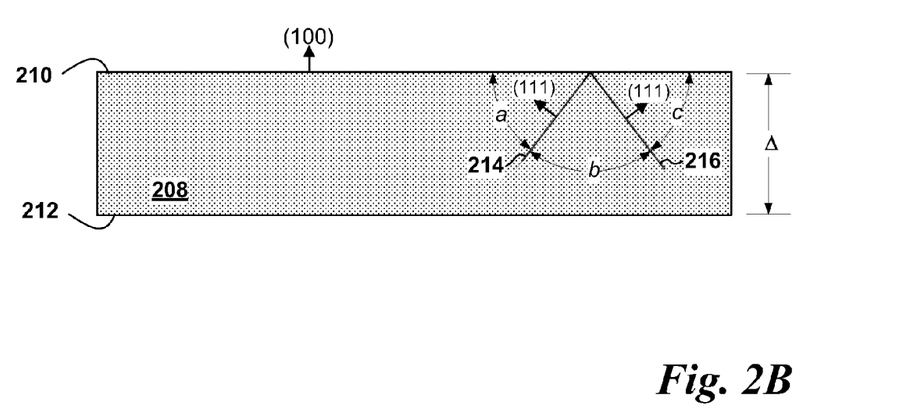

FIG. 2B illustrates an embodiment of wafer 208 cut from boule 202. Wafer 208, or some part thereof, can be used as a substrate on which one or more reflectors can be formed to make a waveguide. As a result of being cut from the boule along planes normal to the axis, wafer 208 has a top surface 210 and a bottom surface 212. Surfaces 210 and 212 are spaced apart by thickness Δ, are parallel to each other, and are both (100) crystallographic planes of the material. The alignment of crystallographic planes within the material of wafer 208 is governed by the crystal structure of the material. In wafer 208, the material includes a pair of (111) crystallographic planes 214 and 216. Plane 214 is oriented at angle a relative to surface 210, while plane 216 is oriented at angle c relative to surface 210. Planes 214 and 216 are positioned at angle b relative to each other, and the intersection of planes 214 and 216 with surface 210 forms a line. The values of angles a, b, and c can depend on the material of which wafer 208 is made. In an embodiment in which wafer 208 is of a material having a diamond or cubic crystal structure, angles a and c will have values of approximately 54.7°, while angle b will have a value of approximately 70.6°. In materials with other crystalline structures angles a, b and c can have other values.

Figure 2C:
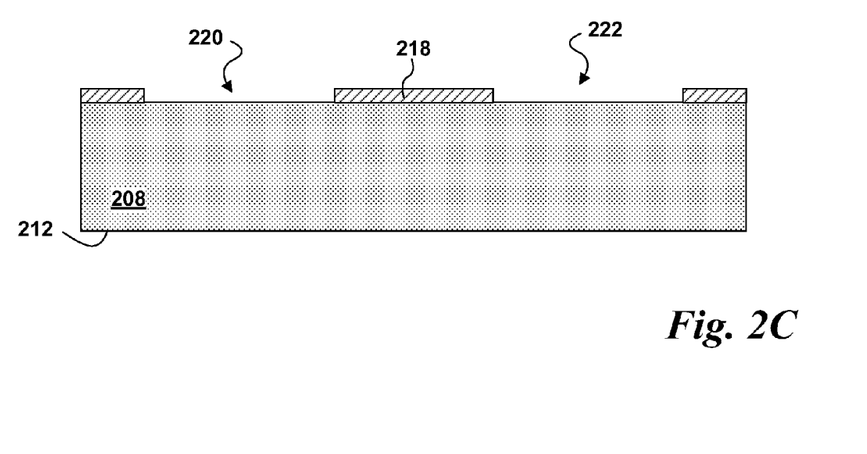

FIG. 2C illustrates a next part of the process. A mask 218 is formed on the surface 210 and is patterned to create openings 220 and 222 where the reflectors will be formed on wafer 208. Mask 218 can be formed using standard photolithographic patterning and etching methods, in which the material that will form mask 218 is deposited on surface 210, is lithographically patterned, and is then etched to form the mask that exposes selected areas of surface 210. In one embodiment, mask 218 can be made of silicon nitride, but in other embodiments mask 218 can be made of other materials that are compatible with the etchants that will be used in forming the reflectors.

Figure 2D:
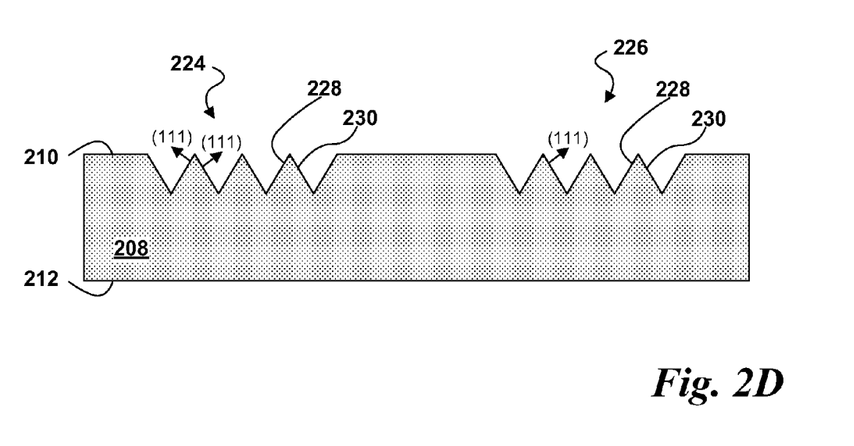

FIG. 2D illustrates the results of the process, in which reflectors 224 and 226 are formed in surface 210 of wafer 208. Starting with the wafer as shown in FIG. 2C, wafer 208 is subjected to a selective etch. In one embodiment, the selective etch can be carried out using an etchant such as potassium hydroxide (KOH), which selectively etches (100) planes more quickly than (111) planes. In other embodiments, however, other agents can be used for selective etching depending on factors such as the material used for wafer 208. The results of the selective etching of surface 210 is the exposure of a plurality of (111) planes 228 and 230 in each of reflectors 224 and 226. The (111) planes 228 and 230 form the reflective surfaces of reflectors 224 and 226. The resulting device can be used as a waveguide itself, as a master mold for making a waveguide, or as a mold for making tools for making waveguides. If used as a waveguide, the surfaces can optionally be coated with metal or a multilayer film stack to provide high reflectance to the propagating rays.

Figure 3A:
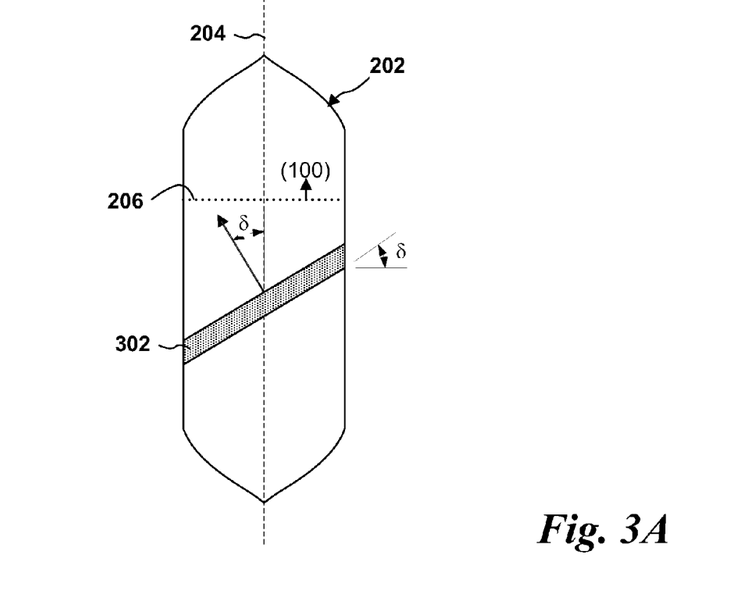
FIGS. 3A-3F are cross-sectional drawings of another embodiment of a process for forming one or more reflectors in a substrate.

FIGS. 3A-3F together illustrate another embodiment of a process for forming reflectors in a substrate. FIG. 3A illustrates an initial part of the process, which again starts with a boule 202 that is axisymmetric about axis 204 and has its (100) crystallographic planes oriented normal to axis 204. A wafer 302 is cut from boule 202 such that at least one surface of wafer 302 forms an angle δ relative to the (100) crystallographic planes of the boule. Stated differently, wafer 302 is cut from boule 202 such that the normal of at least one wafer surface forms an angle δ relative to boule axis 204. As a result, wafer 302 will have a more elliptical shape than wafer 208. In another embodiment, a more round wafer such as wafer 208 can be cut from the boule and one or both surfaces can be ground or polished at angle δ.

Figure 3B:
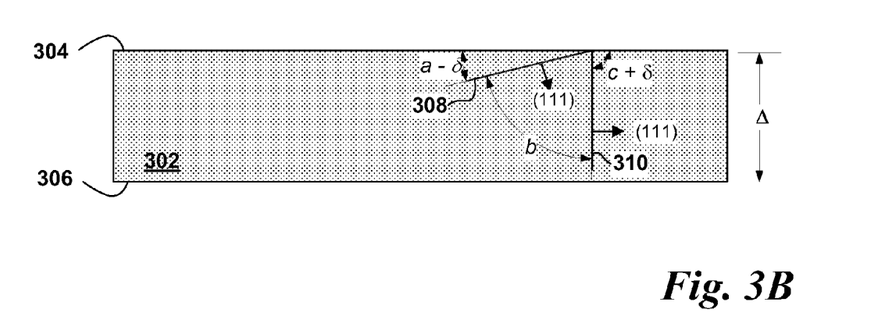

FIG. 3B illustrates an embodiment of wafer 302. Wafer 302 includes a top surface 304 and a bottom surface 306 spaced apart from each other by thickness Δ. The material of wafer 302 has therein a pair of (111) crystallographic planes 308 and 310, but because wafer 302 was cut from boule 202 at angle δ relative to the axis of the boule, the (111) planes 308 and 310 are also rotated relative to surface 304. Specifically, because wafer 302 was cut from boule 202 at selected angle Δ, (111) plane 308 is positioned at an angle a−δ relative to surface 304, while (111) plane 310 is oriented at an angle c+δ relative to surface 304. In an embodiment in which the material of wafer 302 is the same as the material of wafer 208 angle b between (111) planes 308 and 310 remains the same as in FIG. 2B. In the illustrated embodiment, selected angle δ is approximately half the angle b, which results in a rotation of the planes such that the (111) planes lie at angles of 19.3 degrees and 90 degrees with respect to the surface 304. The intersection of the two (111) planes with the surface 304 form parallel lines at the surface plane.

Figure 3C:
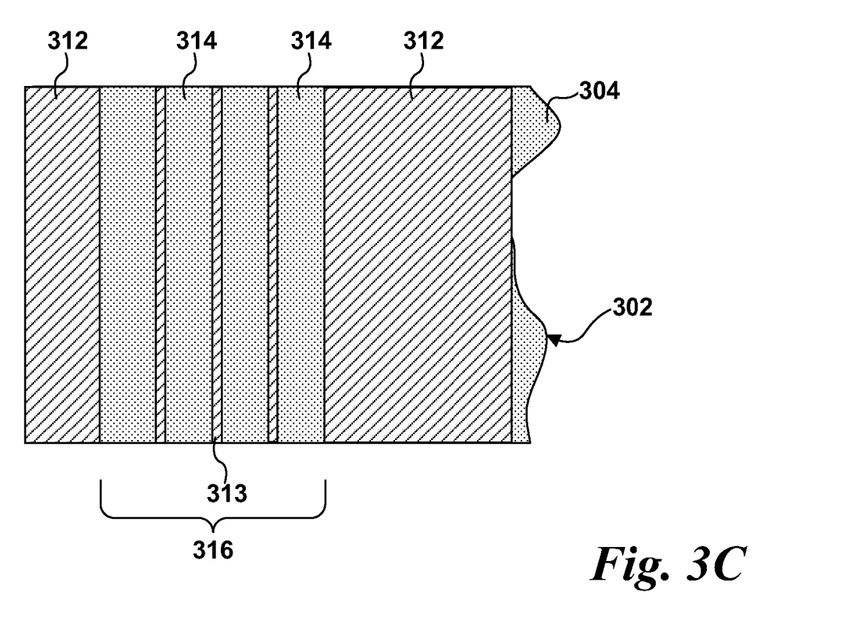
Figure 3D:
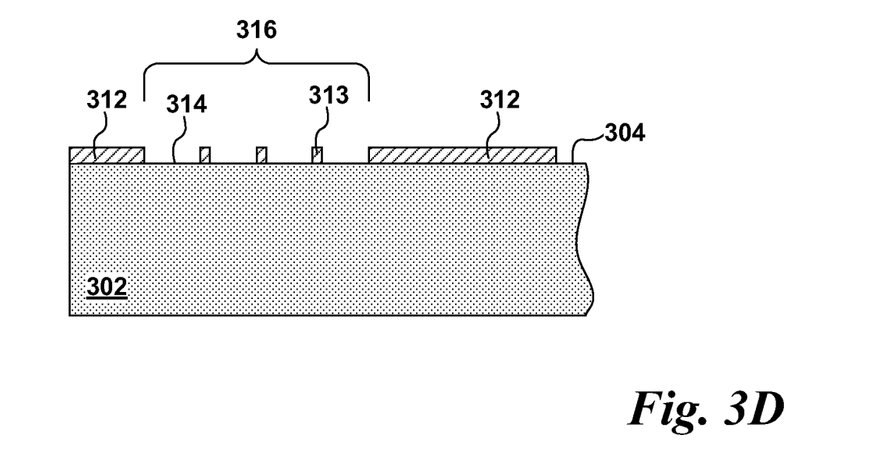

FIGS. 3C-3D illustrate a next part of the process; FIG. 3C is a plan view, while FIG. 3D is a sectional view. A mask 312 is formed on surface 304 and is patterned to create one or more reflectors such as reflectors 316 on surface 304. Mask 312 can be formed using lithographic patterning and etching, in which the material for mask 312 is deposited on surface 304 and is then patterned and etched to form a mask that exposes the areas of surface 304 where reflectors 316, or parts thereof, will be formed. In one embodiment, mask 312 is made of silicon nitride, but in other embodiments mask 312 can be made of other materials that are compatible with the etchants that will be used in forming reflector 316. To form multiple reflective surfaces 318 for reflector 316 (see FIG. 3E), mask 312 includes stripes 313 that are aligned with a line formed by the intersection of (111) planes 308 and 310 with surface 304. In the illustrated embodiment reflector 316 consists of several reflective surfaces, but in other embodiments reflector 316 can have other configurations (see, e.g., FIGS. 4A-4D).

Figure 3E:
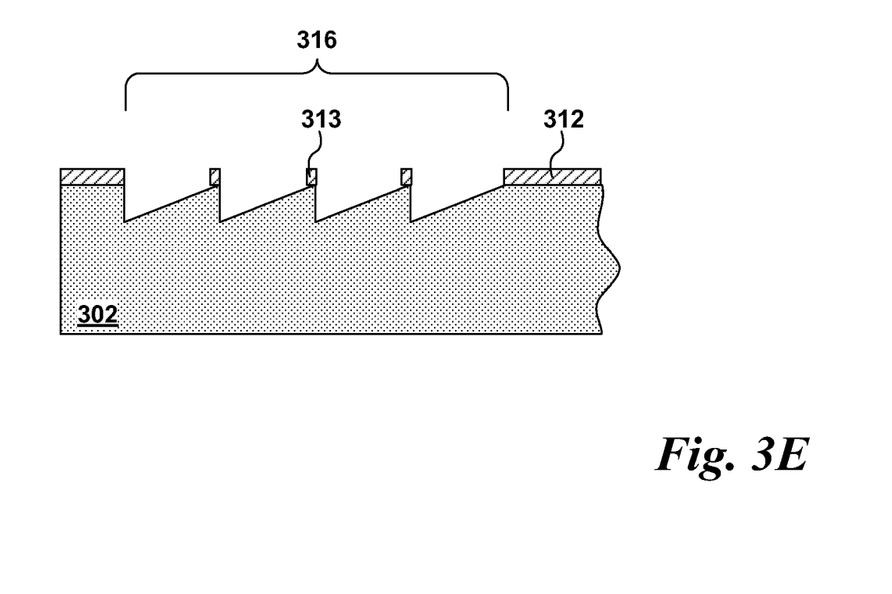

FIG. 3E illustrates the process part way through etching reflectors 316 in surface 304. Starting with the configuration shown in FIG. 3D, surface 304 is subjected to a selective etch. In one embodiment, the selective etch can be carried out using an etchant such as potassium hydroxide (KOH), which is known to selectively etch (100) planes more quickly than (111) planes. In other embodiments, however, other etchants can be used for selectively etching surface 304; the exact etchant used will depend on factors such as the material of wafer 302.

Figure 3F:
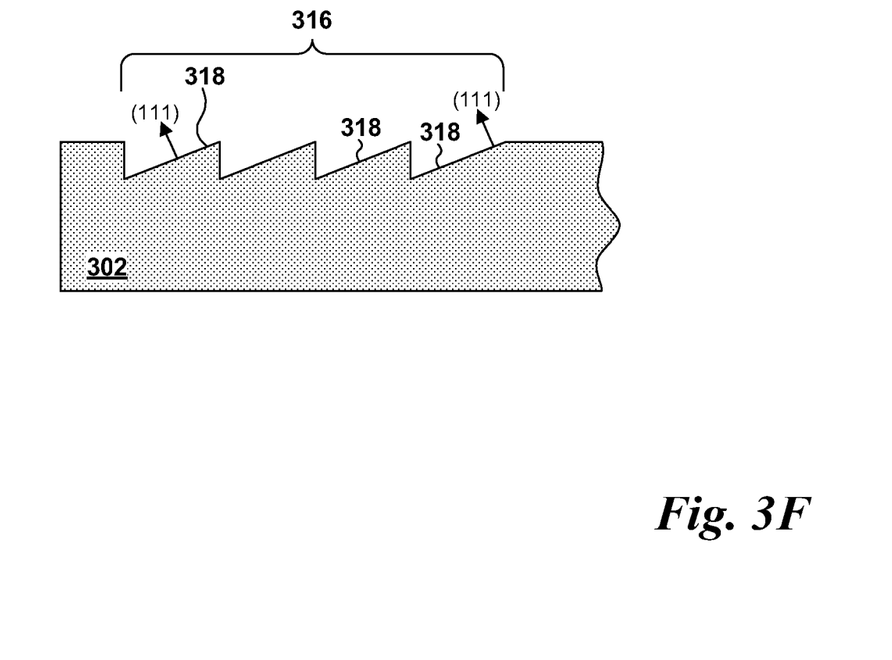

FIG. 3F illustrates a result of the process. Starting with the configuration shown in FIG. 3E, the etch is allowed to proceed until it undercuts mask 312 to form fairly sharp edges, after which the selective etch can be terminated. Any parts of mask 312 that remain at the conclusion of the etch are cleared from the surface of wafer 302. The result of the selective etching is the exposure of a plurality of (111) planes that form the reflective surfaces 318 of reflector 316. Reflective surfaces 318 are characterized by nearly perfect orientation of the crystal planes. The structure shown in the figure can be directly used as a waveguide, or can be used as a master for creating inserts for injection molding, casting or hot pressing. Because the crystal planes are nearly perfectly oriented and flat, by orienting the reflective surfaces with respect to the crystal structure, waveguides or tooling can be created with near perfect orientation. If used as a waveguide, the surfaces can optionally be coated with metal or a multilayer film stack to provide high reflectance to the propagating rays.

Figure 4A:
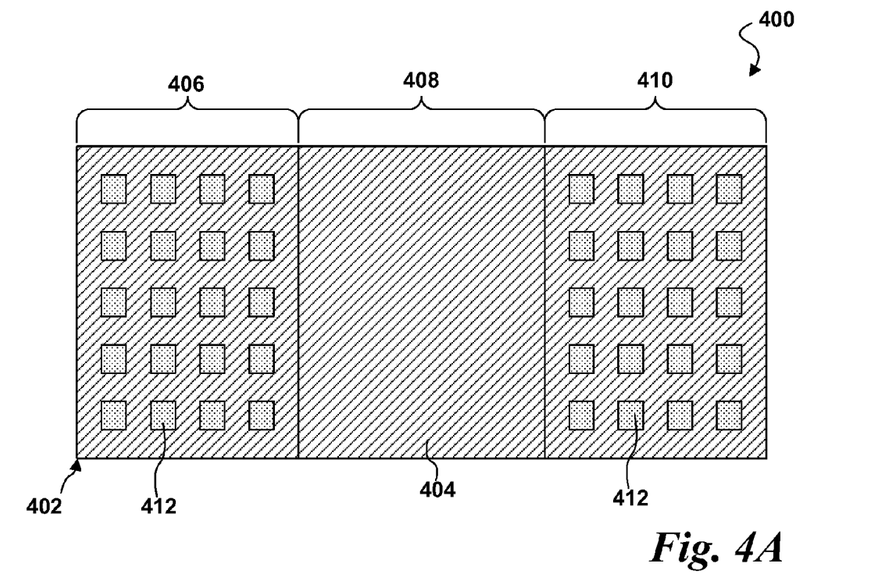
FIGS. 4A-4D are drawings of an embodiment of a process for forming one or more two-dimensional reflectors in a substrate.

FIGS. 4A-4D together illustrate an embodiment of a process for producing an alternative embodiment of a waveguide 400. FIG. 4A illustrates an initial part of the process, in which reflectors 406 and 410 are patterned in a mask 404 formed on a surface of a substrate 402. Mask 404 includes a plurality of individual quadrilateral openings 412 for reflectors 406 and 410. The crystallographic orientation of substrate 402 will depend on the configuration desired for the individual reflecting surfaces within reflectors 406 and 410. In the illustrated embodiment substrate 402 can be a conventional (100) wafer as shown in FIG. 2B, but in other embodiments it can be a substrate with its crystallographic planes rotated by a selected angle δ, such as the wafer shown in FIG. 3B. In the illustrated embodiment mask openings 412 are of the same size and are regularly spaced, but in other embodiments they need not be of the same size, nor do they need to be regularly spaced.

Figure 4B:
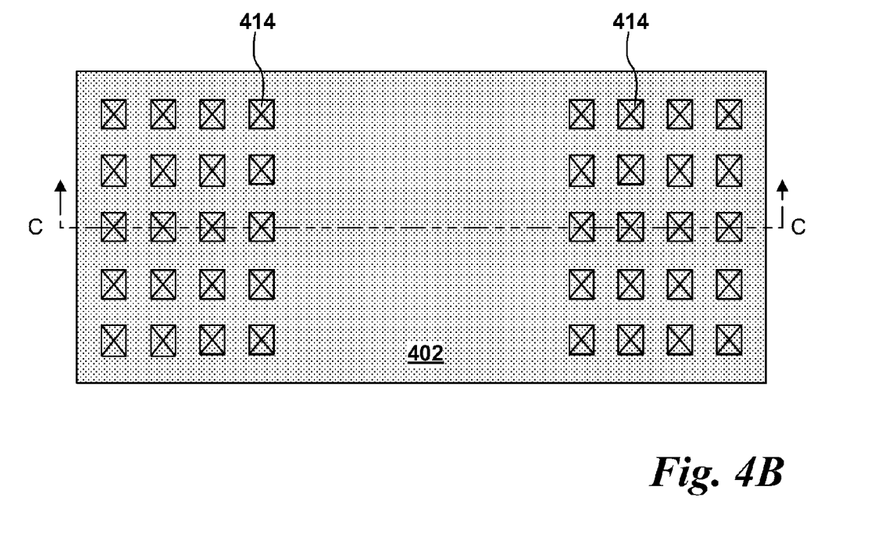
Figure 4C:
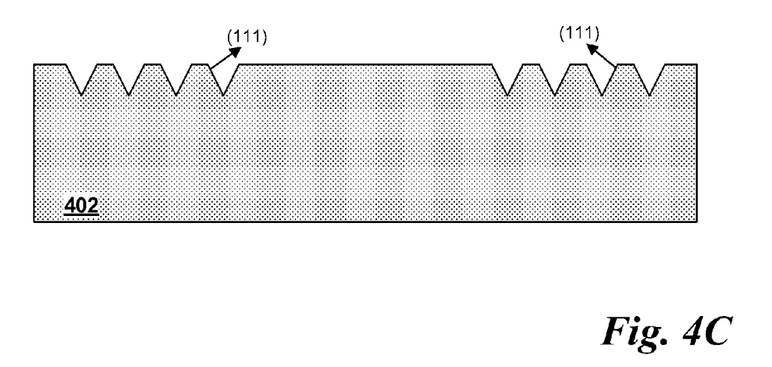
Figure 4D:
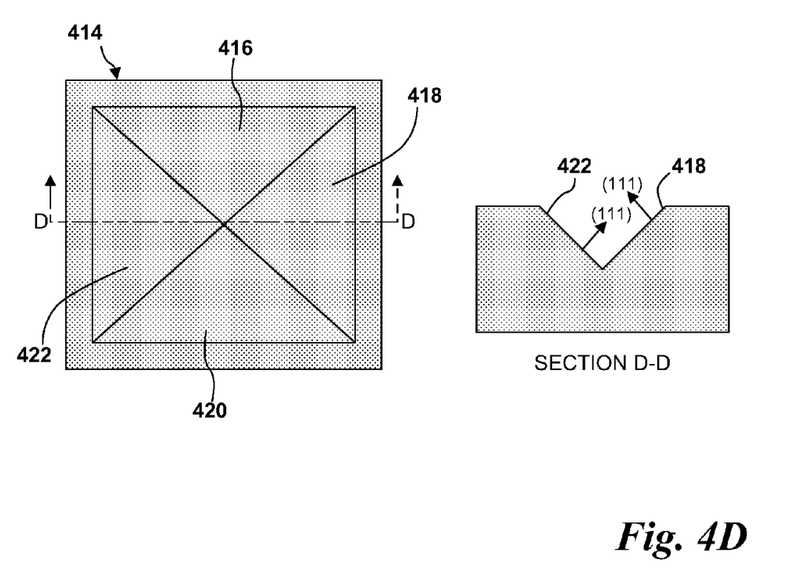

FIGS. 4B-4D illustrate an embodiment of waveguide that results from selectively etching wafer 402 patterned as shown in FIG. 4A. The resulting waveguide includes reflectors 406 and 410, each of which includes an array of individual reflectors 414. As shown in FIGS. 4C-4D, each reflector 414 is shaped substantially like an open-ended pentahedron including four reflective faces 416, 418, 420 and 422. Each of reflective faces is formed along the (111) planes of the material, is shown by the sectional view in FIG. 4D.

Figure 5A:
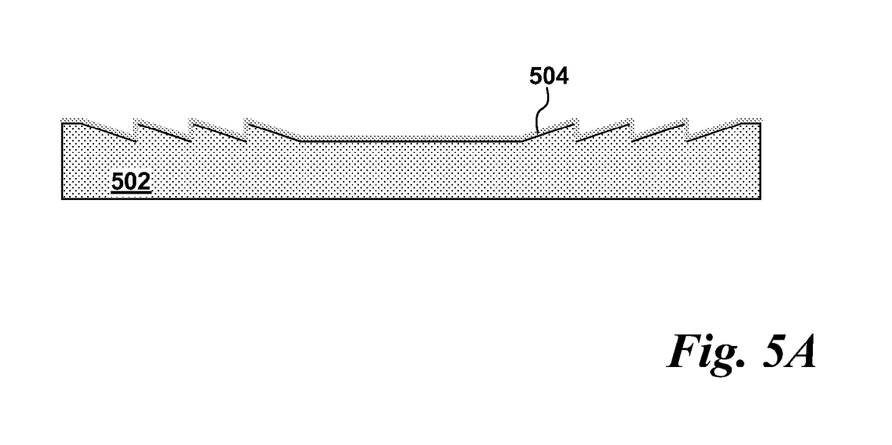
FIGS. 5A-5D are cross-sectional drawings of an embodiment of a process for manufacturing an image relay waveguide.

FIGS. 5A-5D illustrate an alternative embodiment of a process for forming a waveguide. FIG. 5A illustrates an initial part of the process in which a master mold 502 has been formed in a wafer or substrate using the process embodiments illustrated by FIGS. 2A-2B or FIGS. 3A-3F. The pattern formed in master mold 502 can be the opposite or "negative" of the pattern desired for the final molded waveguide. A coating 504 can optionally be deposited on the molding surface of the master mold to prevent the waveguide material from sticking to mold 502. Coating 504 should make the finished molded waveguide easier to remove from the mold without affecting the planarity or orientation of the reflective surfaces. Examples of materials that can be used as coating 504 include metals such as Nickel (Ni), compounds such as silicon oxide (nominally $SiO_2$) or aluminum oxide (nominally $Al_2O_3$), or other films such as Teflon.

Figure 5B:
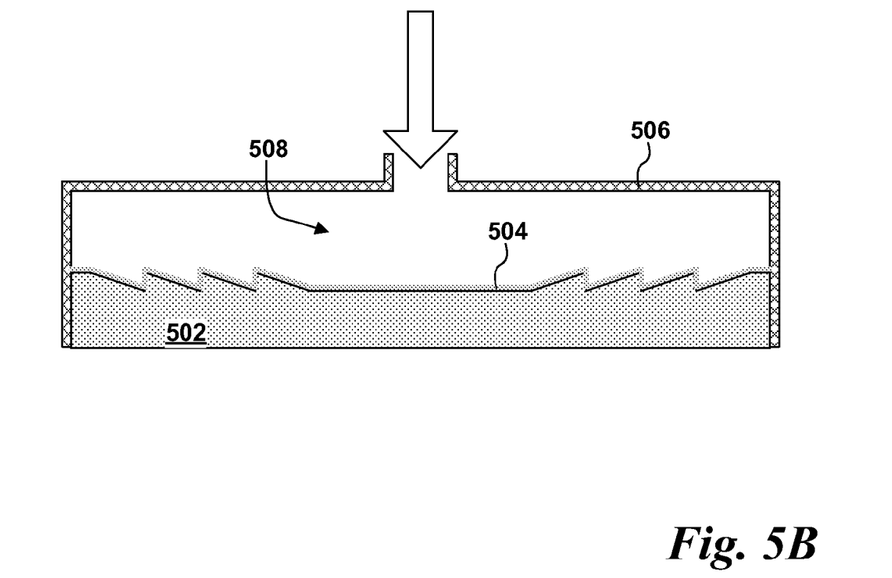

FIG. 5B illustrates a next step in the process. Master mold 502 is coupled with a vessel 506 such that interior of vessel 506 and the surface of master mold 502 thus form an internal cavity 508 into which waveguide material can be injected, as shown by the arrow. Waveguide material is injected to fill cavity 508 and, once injected, allowed to cure if necessary. The material used for the molded waveguide can depend upon the application, but can generally be a material that is optically transparent in the desired wavelength range. In one embodiment, for example, in optically transparent thermoplastic such as polycarbonate can be used.

Figure 5C:
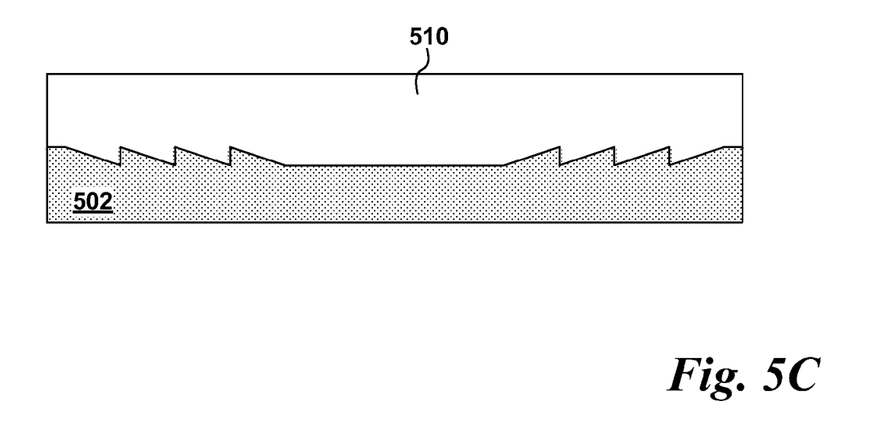
Figure 5D:
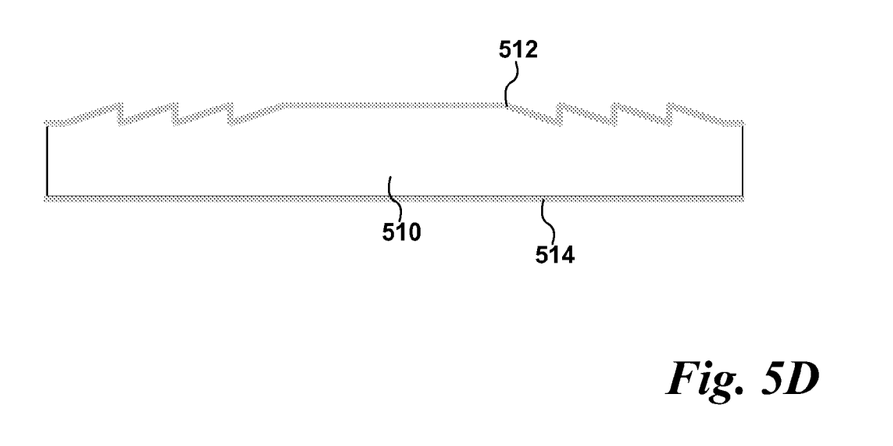

FIGS. 5C-5D illustrates next steps in the process. In FIG. 5C, after the waveguide material has been injected into internal cavity 508 and allowed to cure if necessary, the resulting molded waveguide 510 and master mold 502 are removed from vessel 506. In FIG. 5D, molded waveguide 510 is removed from master mold 502. Optional coatings 512 and 514 can be deposited on the surfaces of molded waveguide 510 to improve its operation. Examples of coating that can be used for coatings 512 and 514 include anti-reflective coatings or, in an embodiment where molded waveguide 501 will not operate by total internal reflection, reflective coatings such as metal.

Figure 6:
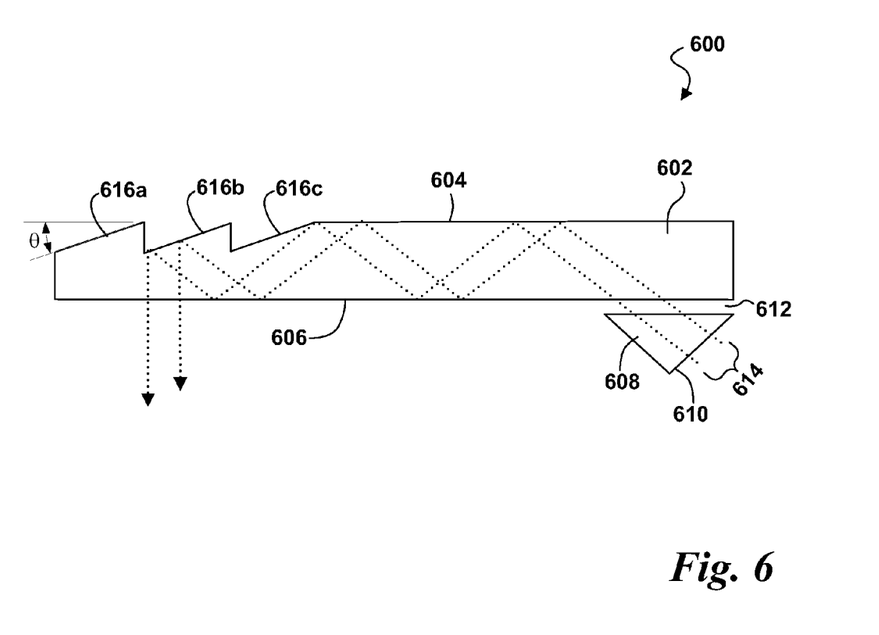
FIG. 6 is a cross-sectional drawing of an embodiment of an image relay waveguide.

FIG. 6 illustrates an embodiment of a waveguide 600 that can be made using the previously illustrated process embodiments. Light rays 614 are incident on the surface 610 of prism 608, which couples the rays into the waveguide 602 with minimal refraction. An optional air gap 612 can be provided to insure total internal reflection on the surface 606 between prism 608 and waveguide material 602. Rays 614 propagate through the waveguide by total internal reflection from surfaces 604 and 606. If the angle between the reflective surfaces 616a-616c and the surface 604 is θ, the angle between the rays 614 and the surface 604 is 2θ.

In one embodiment, reflective surfaces 616a-616c with angles of approximately 19.3 degrees can be formed using the process embodiments previously disclosed, making the angle between rays 614 and the reflective surfaces approximately 38.6 degrees. The critical angle for total internal reflection is given by:

$$\theta = \sin^{-1}\left(\frac{n_1}{n_2}\right)$$

where $n_1$ is the index of refraction of the medium in which the waveguide is placed and $n_2$ is the index of refraction of waveguide material 602. This means that in an embodiment where reflective surfaces of the waveguide interface with air (i.e., $n_1=1$) waveguide's index of refraction $n_2$ must be greater than 1.6. High-index monomers used in modern spectacle lenses meet this requirement. For materials with lower index of refraction, such as common glasses, the surfaces can be coated with metal or a multilayer film stack to provide high reflectance to the propagating rays.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A process for forming a molded waveguide, the process comprising:
    preparing a waveguide mold, the waveguide mold comprising a master mold including one or more reflectors on a surface of a substrate of a master mold material, the surface oriented at a selected angle relative to a (100) crystallographic plane of the material, each reflector including one or more reflective surfaces formed by (111) crystallographic planes of the material;
    coating the surface of the master mold with a layer that prevents the waveguide material from sticking to the mold;
    injecting a waveguide material into the waveguide mold; and
    releasing the molded waveguide from the waveguide mold.

2. The process of claim 1, further comprising curing the waveguide material.

3. The process of claim 1 wherein the master mold material is single crystal silicon.

4. The process of claim 1 wherein the selected angle is approximately half the angle between (111) crystallographic planes of the material.

5. The process of claim 1 wherein the coating is metal, silicon oxide, aluminum oxide or Teflon.

* * * * *